(12) United States Patent
Goldenstein (10) Patent No.: US 9,889,593 B2
(45) Date of Patent: Feb. 13, 2018

(54) CALIBRATING DEVICE FOR A BLOWN FILM TUBE

(75) Inventor: Jens Goldenstein, Osnabrueck (DE)

(73) Assignee: WINDMOELLER & HOELSCHER KG, Lengerich (DE)

( * ) Notice: Subject to any disclaimer, the term of this patent is extended or adjusted under 35 U.S.C. 154(b) by 0 days.

(21) Appl. No.: 13/820,857

(22) PCT Filed: Sep. 8, 2011

(86) PCT No.: PCT/EP2011/065575
§ 371 (c)(1),
(2), (4) Date: Mar. 5, 2013

(87) PCT Pub. No.: WO2012/032128
PCT Pub. Date: Mar. 15, 2012

(65) Prior Publication Data
US 2013/0161852 A1    Jun. 27, 2013

(30) Foreign Application Priority Data
Sep. 8, 2010   (DE) .................. 10 2010 040 436

(51) Int. Cl.
| B29C 47/90 | (2006.01) |
| B29D 23/00 | (2006.01) |
| B29C 47/00 | (2006.01) |
| B29C 47/34 | (2006.01) |
| B29C 47/20 | (2006.01) |
| B29C 47/88 | (2006.01) |

(52) U.S. Cl.
CPC ........ B29C 47/903 (2013.01); B29C 47/0021 (2013.01); B29C 47/0026 (2013.01); B29C 47/34 (2013.01); B29C 47/907 (2013.01); B29D 23/00 (2013.01); B29C 47/20 (2013.01); B29C 47/884 (2013.01); B29C 47/8835 (2013.01); B29C 47/908 (2013.01)

(58) Field of Classification Search
CPC ..... B29C 47/0026; B29C 47/20; B29C 47/34; B29C 47/8835; B29C 47/903; B29C 47/907
USPC ...................................... 425/66, 72.1, 326.1
See application file for complete search history.

(56) References Cited

U.S. PATENT DOCUMENTS

| 3,622,657 | A | * | 11/1971 | North et al. ..................... 264/39 |
| 3,810,725 | A |   | 5/1974  | Trub et al. |
| 4,220,620 | A | * | 9/1980  | Clifford ........................ 264/560 |
| 5,593,703 | A | * | 1/1997  | Mizutani et al. ... B29C 47/0026 264/180 |
| 7,794,494 | B2 | * | 9/2010  | Sahatjian et al. ............ 623/1.42 |

(Continued)

FOREIGN PATENT DOCUMENTS

| DE | 92 14 651 | 4/1993 |
| EP | 1 857 255 | 11/2007 |
| EP | 1 965 965 | 9/2008 |

(Continued)

*Primary Examiner* — Yogendra Gupta
*Assistant Examiner* — Joseph Leyson
(74) *Attorney, Agent, or Firm* — Jacobson Holman, PLLC.

(57) ABSTRACT

A calibration device for calibrating a film hose produced via a blow-extrusion film device, by which the film hose can be brought into a desired diameter, has at least one film guiding element, by which the film hose can be guided. The film guiding element includes at least one elastically deformable element.

24 Claims, 12 Drawing Sheets

(56) References Cited

U.S. PATENT DOCUMENTS

2008/0099949 A1* 5/2008 Takeuchi et al. ............ 264/150

FOREIGN PATENT DOCUMENTS

| JP | 61-272128 | 12/1986 |
| WO | WO 2007/079899 | 7/2007 |

* cited by examiner

CALIBRATING DEVICE FOR A BLOWN FILM TUBE

CROSS-REFERENCE TO RELATED APPLICATIONS

This is a national stage of PCT/EP11/065575 filed Sep. 8, 2011 and published in German, which has a priority of German no. 10 2010 040 436.5 filed Sep. 8, 2010, hereby incorporated by reference.

BACKGROUND OF THE INVENTION

1. Field of Invention

The invention relates to a calibration device for calibrating a film hose produced via a blow-extrusion device, by which the film hose can be brought to a desired diameter, with the calibration device comprising at least one film guiding element, by which the film hose can be guided.

2. Description of the Prior Art

Such calibration devices have been known for quite some time. In film hoses exiting an annular extrusion nozzle a calibration of the hose to the desired diameter is necessary in order to obtain a product which shows a consistent format.

However, in practice, film hoses are desired whose diameters are different. This can be achieved, in spite of extrusion nozzles the diameter of whose outlets remains unchanged, in that the so-called film bubbles are impinged with different interior pressures, causing the film bubbles to expand differently wide in the radial direction. Of course, the calibration device must be adjustable to various diameters of the film hoses. Here, calibration devices are used, which can be mechanically adjusted.

EP 1 965 965 A1 discloses a calibration device as mentioned at the outset for calibrating a film hose produced via a blow-extrusion film device, with the calibration device being adjustable to different diameters of the film hose.

It has already proven disadvantageous that the film guiding elements comprising such a calibration device are of limited size. Accordingly, particularly in large diameters, there are wide ranges of external surfaces of the film hose which are not guided by a film guiding element. Additionally, a film guiding element can only be curved for a single diameter so that it can contact with its entire surface the external perimeter of the film hose. Additionally, the construction and the design of such a calibration device is complex and therefore expensive.

SUMMARY OF THE INVENTION

The objective of the present invention is therefore to suggest a calibration device which overcomes the disadvantages of prior art.

The objective is attained with a calibration device as described herein that includes a film guiding element. The film guiding element has an elastically deformable element that contains a first fluid, and is located outside of the guided film, and a second fluid disposed between the film guiding element and an external surface of the film.

Accordingly it is provided that the film guiding element comprises at least one elastically deformable element. Here, elastically deformable means that the surface of the element can be enlarged or reduced. Other features of the element can be influenced, too, such as the shape, the size, the spatial volume, the volume circumscribed by an element (for example, a hose or a tire), and the area circumscribed. In particular, by the elastic deformation the surface which accepts the guiding of the film hose can be enlarged or reduced. Thereby, for example, in an increasing diameter of the film hose the surface of the elastically deformable element of the film guiding element can also be enlarged, in order to here too allow in a large diameter to guide a portion of the external surface of the film hose to as great an extent as possible. Additionally, this way the film guiding element can be well adjusted to the curvature of the external surface of the film hose. In the ideal case, shortly after entering the calibration device the film hose is entirely surrounded by one or more elastically deformable elements over a certain distance in its direction of travel.

In particular but not exclusively, in the latter case it is particularly well possible to introduce a fluid between the film guiding element and the external surface of the film hose, primarily a liquid. This creates a fluid buffer between the two components so that the film hose can be guided past the film guiding element with as little friction as possible and thus without any damage to the extent possible. A particularly important advantage of the fluid buffer is, however, that it can cool the film hose well. For this purpose, a liquid is beneficial in reference to gas due to the greater thermal capacity. Water is here particularly preferred, because it can easily be handled.

In another embodiment of the invention at least one force generation device is provided, by which a force can be provided acting upon the elastically deformable element. This way the elastically deformable element can be brought into a desired size or shape, so that the above-mentioned advantages are fully implemented.

In a first advantageous embodiment, the force generation device comprises at least one adjustment mechanism, by which the force can be adjusted. Here, various components can impact at points or along lines or areas upon the elastically deformable element, thus apply tensile forces and/or pressures.

In a particularly preferred embodiment it is provided that the elastically deformable element impacts at least a fluid, which can be impinged with pressure or a vacuum. The pressure or vacuum is here understood as a pressure difference in reference to the ambient pressure. Any impinging with a vacuum or a pressure leads here to a change in size of the elastically deformable element until the pressure of the fluid together with the return forces of the elastically deformable element and the ambient pressure have resulted in a force-equilibrium. This works like an air balloon, for example.

Other means to generate force based on different physical principles may also be suitable to change the elastically deformable element in its size and/or shape. For example, electrostatic, electromagnetic, and/or magnetic forces may impact the element. Thus, for example, it is possible to integrate magnetic particles into the elastically deformable element or to coat its surface with them. One or more appropriately switched and/or controlled magnets can now engage the elastically deformable element over a large surface.

A preferred embodiment of the invention includes that the elastically deformable element is arranged inside a component which comprises an open hollow space, and which at the facial edges and/or in the area of the exterior surface of the component is in a sealing contact with said cavity and that the space between the tubular or cylindrical element and the elastically deformable element can be impinged with a fluid, which is subject to a pressure or a vacuum. The element comprising an open hollow space may, for example, be an open cylinder or a tube section. At the facial sides such a component may deviate from this shape, in order to avoid, for example, sharp edges, which could lastingly damage the elastically deformable element. In the following the functionality of an exemplary embodiment described in this paragraph is explained in greater detail based on the figures. The advantage of such an arrangement is that it operates without any mechanically mobile parts and is very simple in its design and function. Additionally, with this exemplary embodiment a calibration device can be provided in which the film hose is not only entirely encased but in which the internal surface guiding the film hose assumes radially always the same distance from the central axis of the film hose. This feature is generally desired in calibration devices.

In another advantageous embodiment of the invention it is provided to arrange at least one additional elastically deformable element between the elastically deformable element and the element comprising an open cavity. This way, the deformation of the first-mentioned elastically deformable element can be influenced in another frame. This additional, elastically deformable element by itself or in combination with the element comprising an open cavity circumscribes a space which also can be impinged with a vacuum or a pressure. This pressure may be different from the pressure by which the (first mentioned) elastically deformable element can be impinged. This exemplary embodiment is also illustrated and explained in greater detail based on the figures.

It is also advantageous if at least sections of the above-mentioned, elastically deformable elements can be moved in reference to the component along areas of said component. This means that the elastically deformable elements are not required to be fastened on the component. This way it is possible that an elastically deformable element is pulled over the facial edges of a tubular component. Here, an adjustment mechanism may be beneficial. Using this solution the change of size of at least one elastically deformable element can also occur in a simple fashion.

Additional exemplary embodiments of the invention are discernible from the respective description to this regards and the claims.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
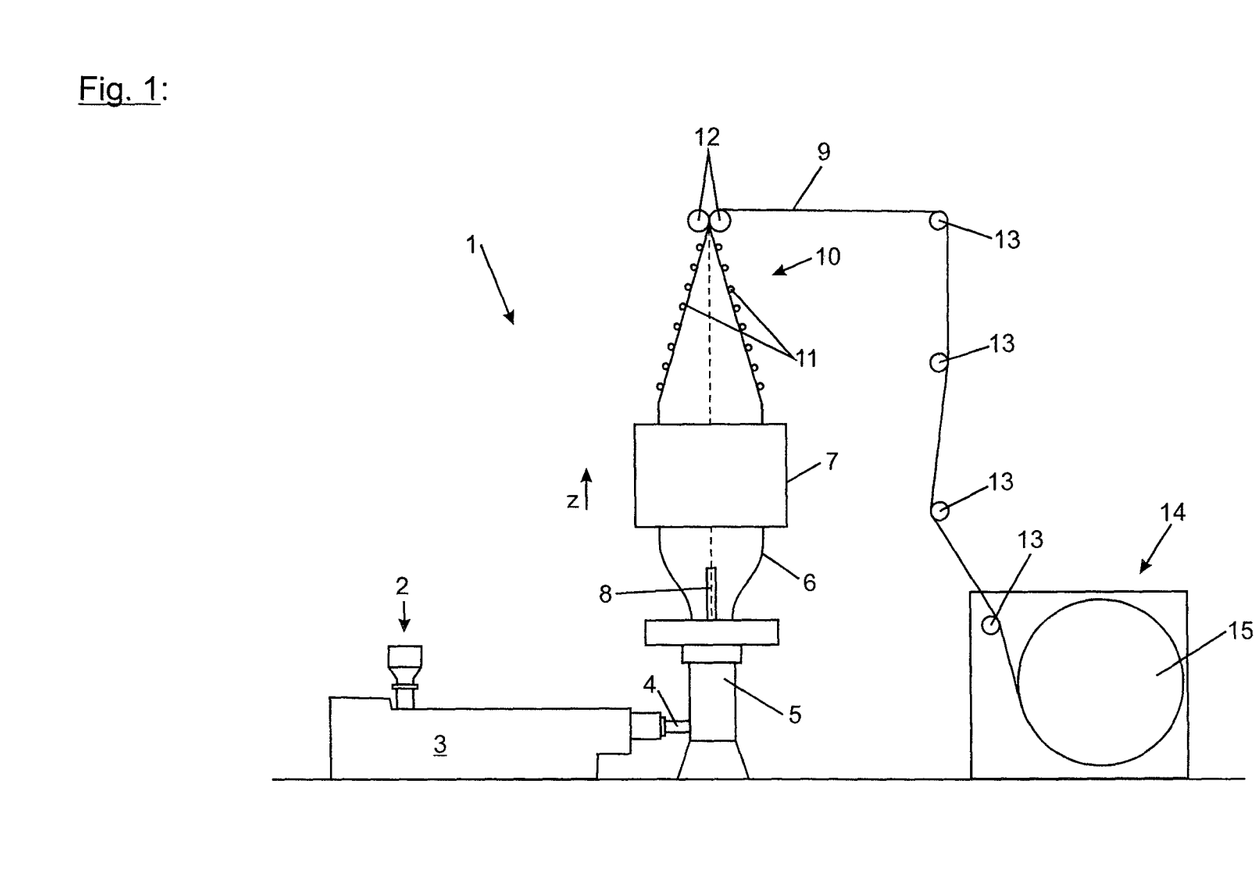
FIG. 1 a sketch of the principle of a blow-extrusion film extrusion device

FIG. 1 shows a sketch of the principle of a blow-extrusion film extrusion device 1 of prior art, which comprises a calibration device according to the invention. Plastic is supplied to the filler necks 2, then plasticized in the extruder 3. The mass developing is fed via the connection line 4 to the blow-head 5, by which a film hose 9 is formed from said mass. Additional extruders may be allocated to the blow-head 5, so that multi-layered films can be produced.

The film hose 9 leaves the blow-head via an annular nozzle, not shown in this illustration, in the direction of transportation z.

When exiting the blow-head 5 the film hose 9 is first present as a film bubble 6, in which a slightly elevated interior pressure is given in reference to the ambient pressure. This is achieved by supplying compressed air via the ventilation nozzle 8. Due to the elevated interior pressure the material of the film hose, not yet cured, widens. Finally this way the diameter of the finished film hose as well as the thickness of the film material is adjusted.

Subsequently the film bubble 6, not yet cured, reaches the calibration device called calibration basket 7. Here, the diameter of the film hose is limited. Inside the calibration device the film hose cools to a temperature at which any subsequent deformation is no longer possible or only possible under the impact of strong forces. The position where this change of phase occurs is frequently called the "frost line."

Inside a calibration device of prior art the film hose is guided by plates by which compressed air is guided to the film hose. This compressed air serves on the one hand to cool the film hose and on the other hand prevents any contacting of the plates by the film hose. In another calibration device the film hose can also be guided by rolls.

After leaving the calibration device the tube reaches a flat placement device 10 in which the film hose is deformed almost or entirely into a dual-layered film web. Here, the film hose is guided between pairs of guide elements 11, which over the course of the direction of transportation z assume an increasingly smaller distance from each other. The guide elements can be equipped similar to the film guiding elements included in the calibration devices according to the invention. The entirely flat placement occurs by a squeezing device, which comprises a pair of squeezing rolls 12. The squeezing rolls 12 prevent here that any air remains inside the film hose during its further transportation.

The film hose 9 and/or the film web developing therefrom can now be guided through a reversing device, not shown, or as in the case of the device shown, directly via deflection rolls 13 to a winding device 14, where the film web is processed to a winding 15.

Figure 2:
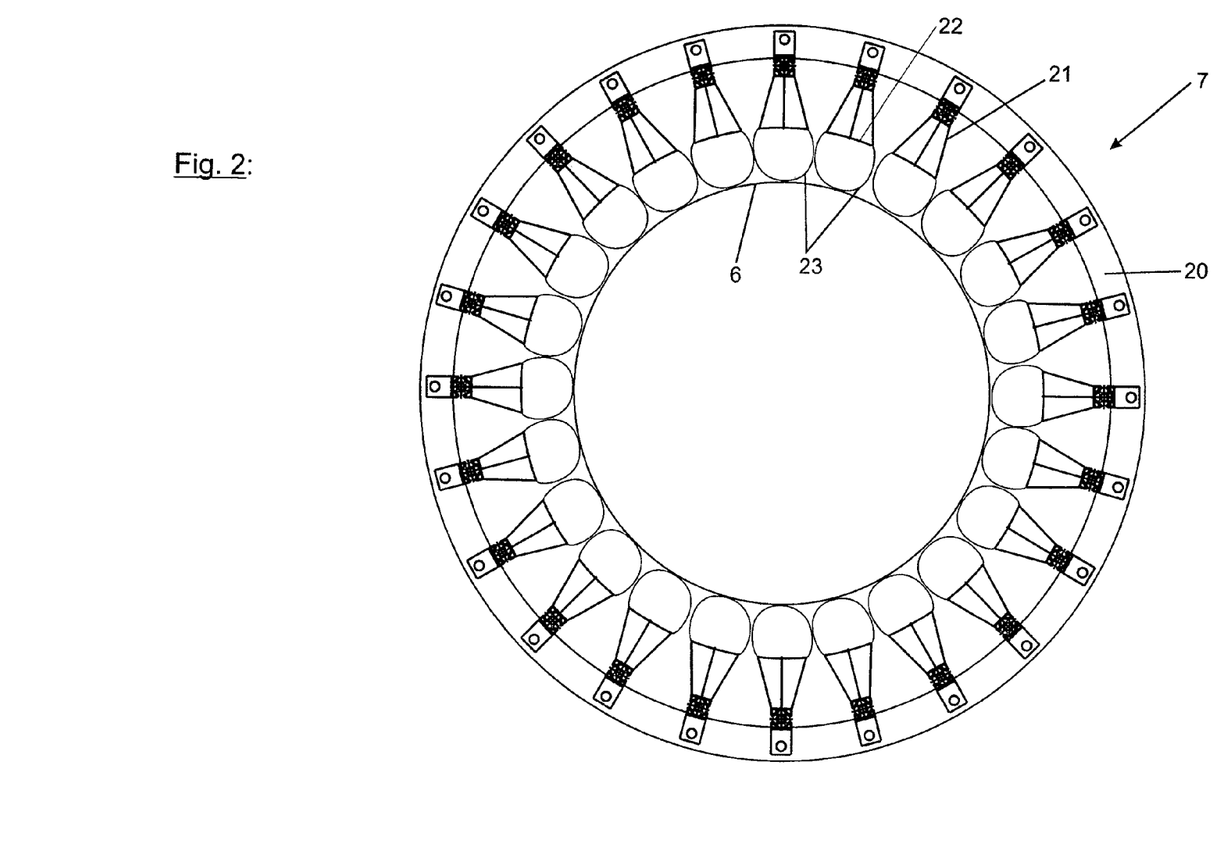
FIG. 2 a top view of a calibration device
Figure 3:
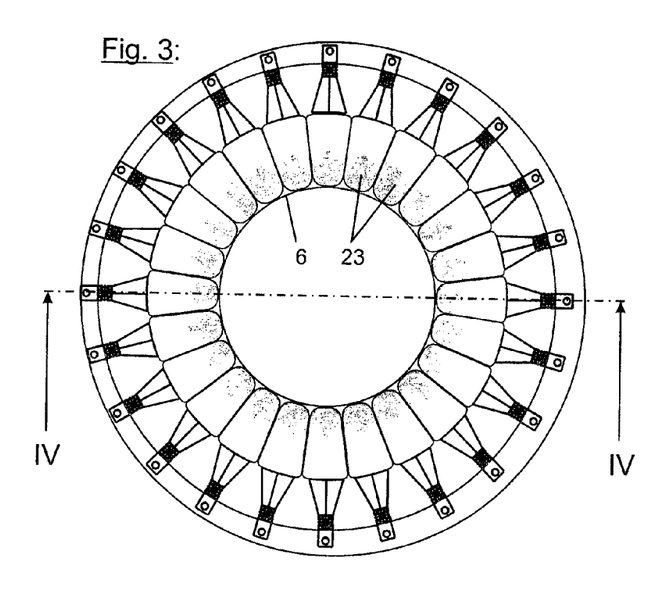
FIG. 3 similar to FIG. 2; however, with film guiding elements which are filled with a greater amount of fluid.
Figure 4:
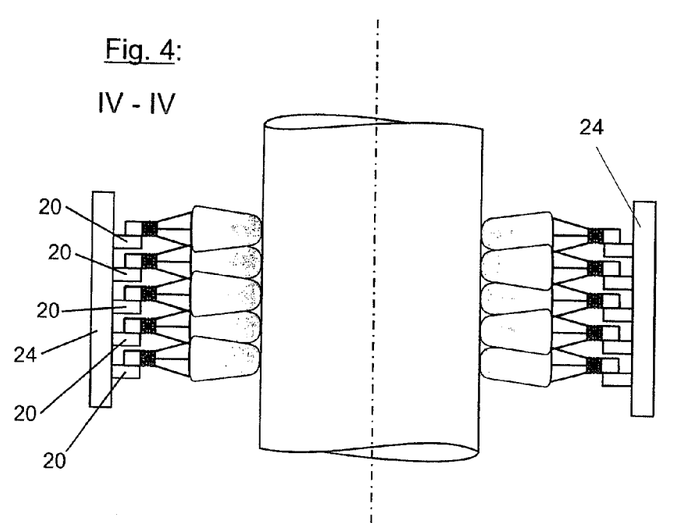
FIG. 4 a cross-section IV-IV of FIG. 3

FIGS. 2 through 4 show a first embodiment of a calibration device according to the invention. It is based on the calibration device shown in EP 1 965 965 A1, with the lever mechanism shown there not being included in this figure. The embodiment of the invention shown in FIGS. 2 through 4 operates without this lever mechanism; however, the latter may be advantageous if a wide adjustment range is desired. The description of such lever mechanisms in EP 1 965 965 A1 (page 5 to page 7) is hereby considered included in this application. However, other adjustment mechanisms of prior art can also be combined with the exemplary embodiment of FIGS. 2 through 4.

FIG. 2 now shows a ring 20, at which several fasteners 21 are arranged distributed over its circumference. Each fastener carries a fastening part 22 at its side facing the film bubble 6, each of which holds one or more elastically deformable elements 23.

The fastening part 22 can be embodied as a plate. Each fastening part may comprise at least one access opening towards the interior of the elastically deformable element so that the elastically deformable element 23 can be filled with a fluid. Preferably this fluid is a gas, particularly air. Respective fluid supply and draining lines may be provided. Now FIG. 2 shows a situation in which the elastically deformable elements are filled with a respectively lower fill amount of fluid so that the elements 23 show a small extension. The elements limit a circumferential perimeter. This circumferential perimeter represents the external wall of the film bubble 6.

In FIG. 3 the elements 23 are each filled with a greater fluid amount, so that it further expands in reference to the situation shown in FIG. 2. In the circumferential direction the expansion is limited by adjacent elements 23, though, so that the expansion occurs primarily inwardly, thus in the direction towards the center of the circle. The described circle therefore becomes smaller. In this case a limit is generated for a film bubble 6 with a smaller diameter.

FIG. 4 shows an arrangement in which several, for example five, rings 20 are arranged on top of each other. The rings 20 are fastened at supports 24, which can be fastened in a manner not shown at the machine support structure and/or the blow-head 5. The fastening directly on the ground of the factory hall or the hall construction is also possible.

Figure 5:
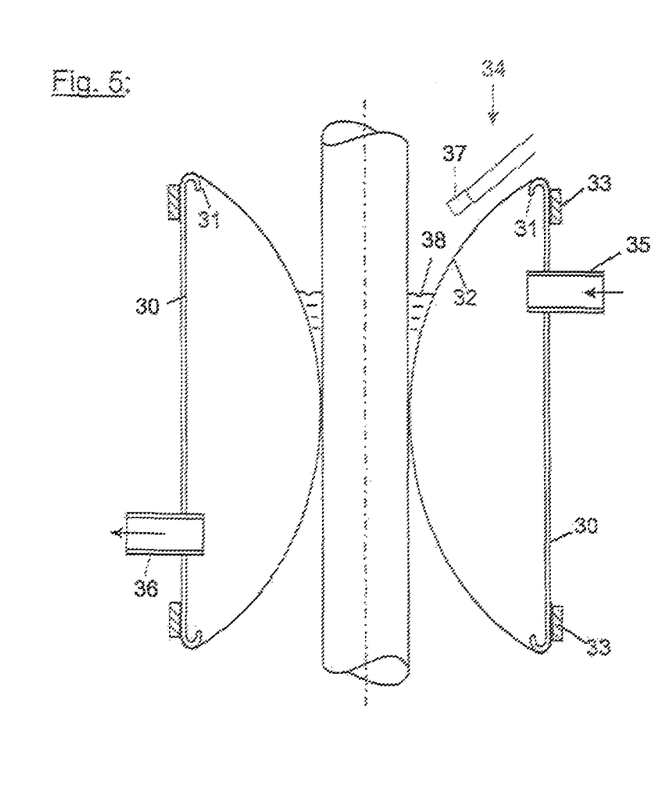
FIG. 5 another embodiment of a calibration device according to the invention

FIG. 5 shows another embodiment of the invention. Here, the base element is a sheath 30 with a large diameter, which should be highly resistant. This may preferably be produced from metal or a metal compound; however, it may also comprise plastic. Other materials are also possible, as long as they are essentially not deformable and not liquid permeable. At its faces the sheath 30 preferably comprises edges 31 bent inwardly.

An elastically deformable element 32 is inserted into the sheath 30, also showing the form of a sheath and/or a tube. The ends of the element 32 are now pulled over the bent edges 31 of the sheath 30 and fixed at the external circumference of the sheath 30. For this purpose, clamping rings 33 or a collar may be provided. Other fastening means and types are also possible. For example, an adhesive connection between the sheath 30 and the element 32 may be provided.

For the fastening it is decisive that a fluid-impermeable connection develops. A clamping ring, a collar, or an equivalent fastening means is advantageous, however, in providing the ability for detachment in case the element 32 needs to be exchanged.

In order to change the interior diameter of the calibration device 34 now the space between the sheath 30 and the elastically deformable element is impinged with a pressure or a vacuum. The terms pressure and vacuum relate to the ambient pressure, of course.

The need for a pressure or a vacuum depends on the original, undeformed shape of the elastically deformable element 32. This may, for example, be a sheath-like formation, with its interior diameter being smaller than the smallest of diameters desired in the calibration device. After fixation of the element 32 its interior diameter has enlarged slightly, if applicable, so that it now may be equivalent to the smallest desired diameter. If the interior diameter shall be adjusted for the calibration of a film bubble 6 with a larger exterior diameter now the space between the element 32 and the sheath 30 is impinged with a vacuum, thus a certain amount of fluid is removed. This fluid in turn may be a liquid or a gas, such as air. By this vacuum the element 32 is now pulled outwardly, thus expanded in reference to its original shape. For this case the FIG. 6 shows the situation in which the space between the element 32 and the sheath 30 is impinged with a vacuum.

The elastically deformable element 32 may, however, show in its original, undeformed shape also an interior diameter, which is equivalent to the largest desired diameter of the film bubble 6. In order to reduce the interior diameter of the element 32 a fluid subjected to a vacuum can be introduced into the space between the element 32 and the sheath 30. The elastically deformable element now expands inwardly so that the smaller interior diameter is adjusted for the calibration of film bubbles 6 with smaller diameters. For this example FIG. 6 may be considered the original state, and FIG. 5 can be considered an example for the space impinged with a pressure.

Figure 6:
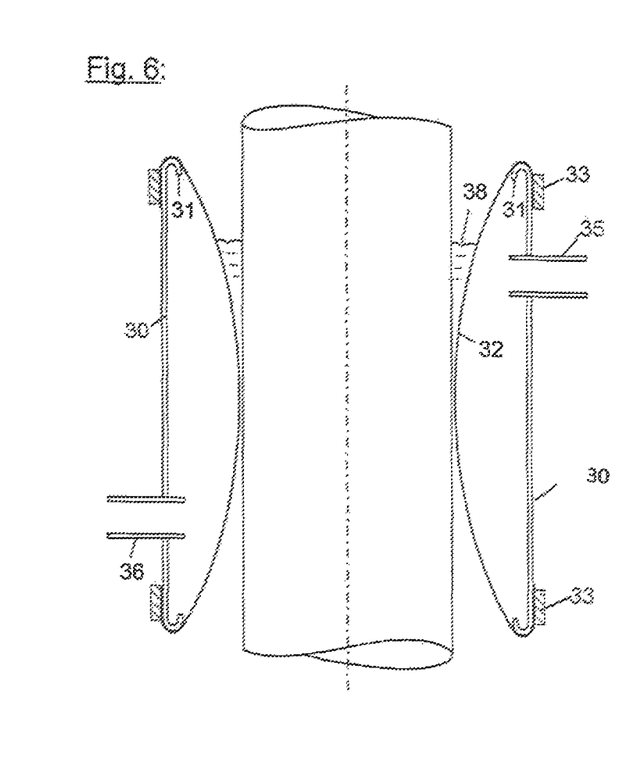
FIG. 6 an exemplary embodiment according to FIG. 5; however, for film hoses with larger diameters FIG. 7 calibration device, similar to FIG. 5; however, with a film guiding element embodied differently FIG. 8 similar to FIG. 7; however, embodied for calibrating a film hose with a larger diameter FIG. 9 similar to FIG. 7; however, with an additional tensile element FIG. 10 similar to FIG. 8; however, with an additional tensile element FIG. 11 another exemplary embodiment of a calibration device according to the invention FIG. 12 similar to FIG. 11; however, with a larger diameter of the film hose FIG. 13 similar to FIGS. 11 and 12; however, with additional hoses FIG. 14 another exemplary embodiment of the invention FIG. 15 similar to FIG. 14; however, for calibrating a film hose with a larger diameter FIG. 16 an exemplary embodiment of the invention, in which the film guiding element is varied in its diameter by a mechanical adjustment device.

FIGS. 5 and 6 further show an inlet opening 35 and an outlet opening 36. One opening would be sufficient for introducing a pressure or a vacuum. Two openings may serve to generate a flow of a coolant. This way, the heat of the film bubble 6 to be cooled can be effectively removed. The coolant is here the fluid subject to a vacuum or a pressure, where this should then be guided in a closed circuit in order to allow maintaining the existing pressure. The fluid can then advantageously release the accepted heat via a heat exchange to the environment or to a coolant.

In order to achieve rapid cooling of the film bubble 6 the provision of a film of cooling water may be helpful between the film bubble 6 and the elastically deformable element 32. For this purpose, a water inlet 37 may be provided, by which water can be provided in a certain quantity per time unit. A water column 38 may form, from which water flows downwards in a defined amount. Here, the water serves not only for cooling the film bubble 6 but also reduces the friction between the film and the elastically deformable element 32 so that the film is not damaged. Instead of water, another suitable liquid may also be used. Of course, a gas may also be used here.

Figure 7:
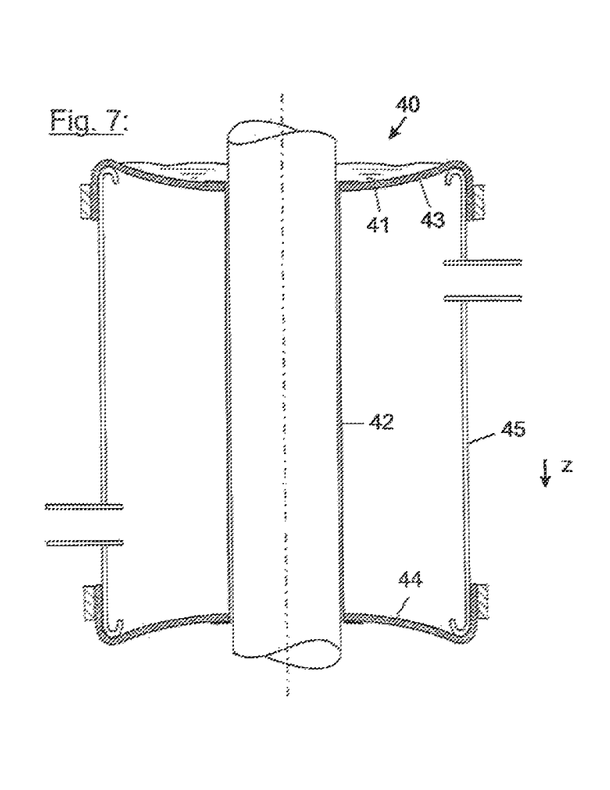
Figure 8:
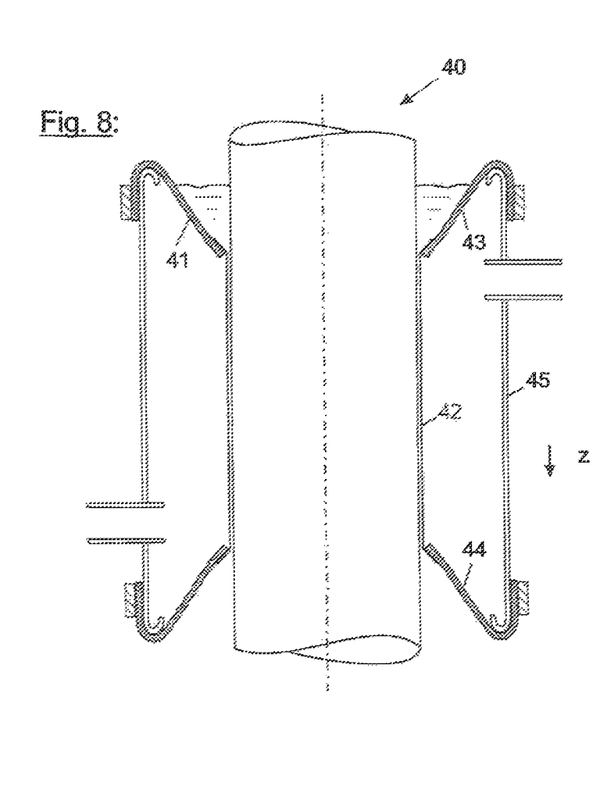

FIGS. 7 and 8 show a calibration device 40 similar to the one shown in FIGS. 5 and 6, in which, however, the elastically deformable element 41 is embodied differently. The elastically deformable element 41 comprises at least three different sections. At first the central section 42 must be mentioned, which in its original, undeformed shape once more represents a tubular or sheath-like element. The sections 43 and 44 are circular and flat elements, each showing in the middle an annular recess. The central section 42 is pierced through this recess. The ends of the central section are now pulled downwards and fastened in a suitable fashion on the central edge of the sections 43 and 44 surrounding the respective recess. This fastening is in turn to be embodied in an air-tight fashion, which shall be achieved preferably via an adhesive connection. However, it is not necessary for the elastically deformed element to be composed from several elements. It may also be produced in one piece or in several pieces with different wall thicknesses. The fastening of the elastically deformable element 41, comprising the sections 42, 43, and 44, at the sheath 45 occurs similar to the exemplary embodiment shown in FIGS. 5 and 6. One advantage of the use of three sections is given such that the central section 42 comprises a larger section, in which the interior diameter is constant in the direction z. This way the film bubble 6 can better be calibrated to the desired diameter. In the exemplary embodiment of FIGS. 5 and 6 the calibration area can perhaps be formed only by a circumferential line. It may be provided that the sections 43 and 44 are less elastic in reference to the section 42, so that they can only be deformed under greater impact of force.

Figure 9:
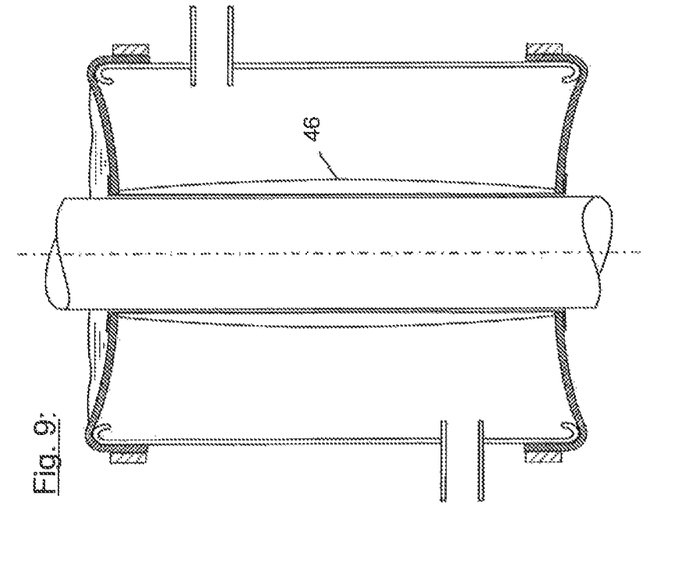
Figure 10:
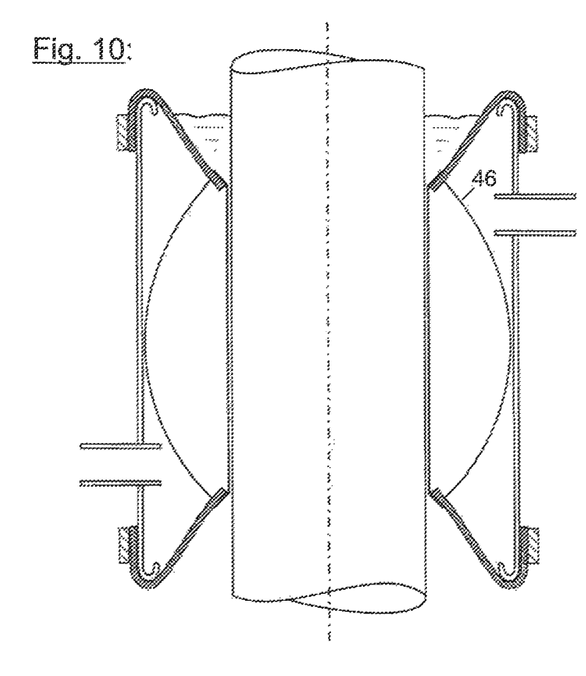

However, it is also possible that the section 42 "deforms" under the influence of a pressure or vacuum, thus fails to generate a large section with a constant diameter. In order to avoid this effect, according to the exemplary embodiment of FIGS. 9 and 10, at least one tensile element 46 may be provided. This tensile element 46 may engage in the proximity of the interior edge of the sections 43 and 44 thereat or at the section 42. If now the tensile element 46 is pulled outwardly, which in turn can occur under the influence of a vacuum, the sections 43 and 44 are moved towards each other. The section 42 subjected to pre-stressing now contracts, with it assuming a fixed interior diameter over its entire length. The tensile element 46 can even be an elastically deformable element. However, several tensile elements are also possible, for example tapes or chains, which are fastened at the sections 43 and 44 and which are moved to enlarge the calibration diameter such that a force component develops directed in the radial direction outwardly.

Figure 11:
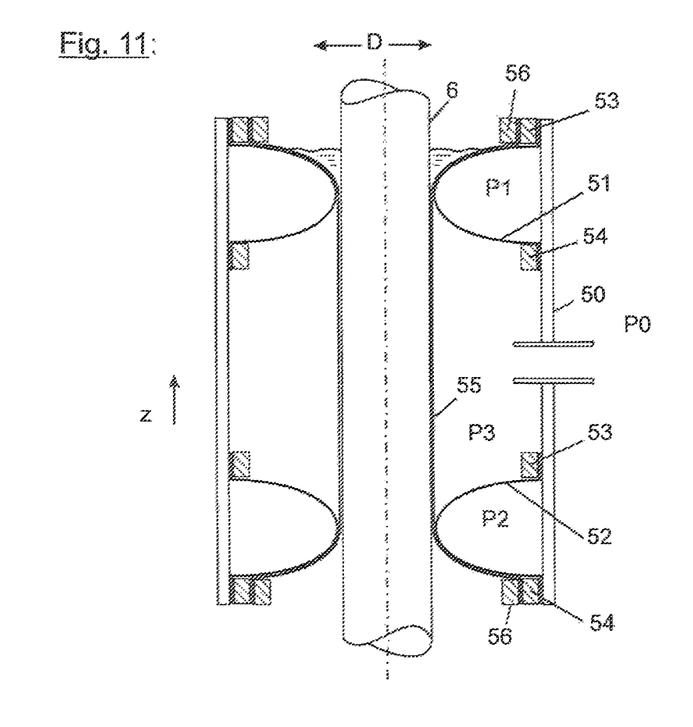
Figure 12:
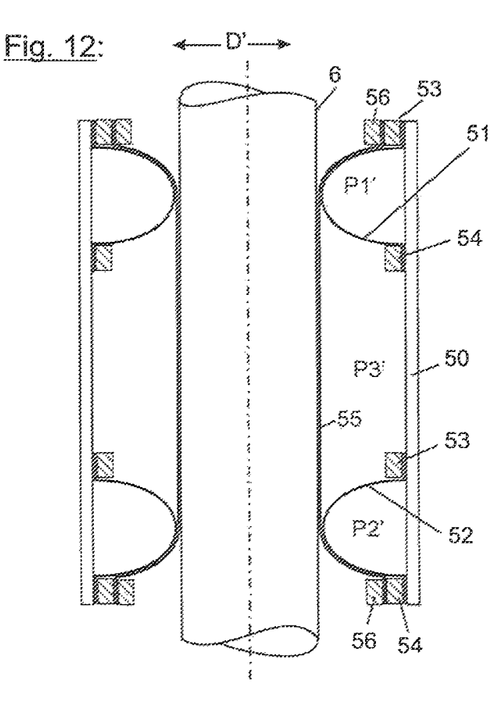

The FIGS. 11 and 12 show another exemplary embodiment which can be considered based on the exemplary embodiment shown in FIGS. 5 and 6. The tube 50 comprises at its upper and its lower end each an annular hose 51, 52. These may be embodied as single-layer elastic elements, which are fastened via rings 53, 54 at the interior wall of the tube 50 and sealed in reference thereto. The hoses 51, 52 can also be embodied as round hoses, which require no sealing in reference to the tube 50 and thus just need to be fastened thereat in a suitable fashion. Here, for example, a simple suspension or a simple adhesion may be sufficient.

An elastically deformable sheath 55 is now fastened thereat, for example also via rings 56, at the upper and the lower end of the tube 50 from the inside, so that the hoses 51 and 52 are located between the sheath 55 and tube 50. The sheath 55 therefore forms in a similar fashion a hose, such as the hoses 51 and 52. The hoses 51 and 52 as well as the sheath 55 combined with the tube 50 limit three chambers, independent from each other, thus not connected.

In order to now change the calibration diameter D only the fluid pressure p1 inside the hose 51 and the fluid pressure p2 of the hose 52 need to be changed. In a simple embodiment p1=p2 applies; however, these pressures may also be different in order to yield, for example, a slightly conical deformation of the sheath 55 in the direction z. In a variant of the discussed embodiment the fastenings, here shown as rings 53 and/or 54, may be displaceable in reference to the tube. In addition to or instead of the change in pressure the fastenings may be displaced so that the calibration diameter is adjustable. The pressure variants inside the hoses 51 and 52 to change the calibration diameter can therefore be kept smaller, which leads to a lower mechanical stress of the elastic material of the hoses.

In order to allow influencing the diameter of the sheath 55 at various positions in the direction z, the pressure p3 may also be variable between the sheath 55 and the tube 50. This variation may be particularly desired for yielding a constant diameter D in order to allow calibrating the film bubble 6 to a constant diameter.

FIG. 11 shows the described embodiment of the invention, in which the calibration device is adjusted to a small diameter D of the film bubble 6. In the hose 51 the pressure p1 is given, in the hose 52 the pressure p2, and in the sheath 55 the pressure p3. FIG. 12 represents the same calibration device, which, however, is adjusted to a greater diameter D'. In the hose 51 here a pressure p1' is given, which is lower than the pressure p1. The pressure p2' is also smaller than the pressure p2. The pressure p3' can be higher or lower than the pressure p3, depending on the given conditions, thus for example depending on the diameter of the original, undeformed sheath or depending on the desired progression of the interior wall of the sheath in the direction z.

Figure 13:
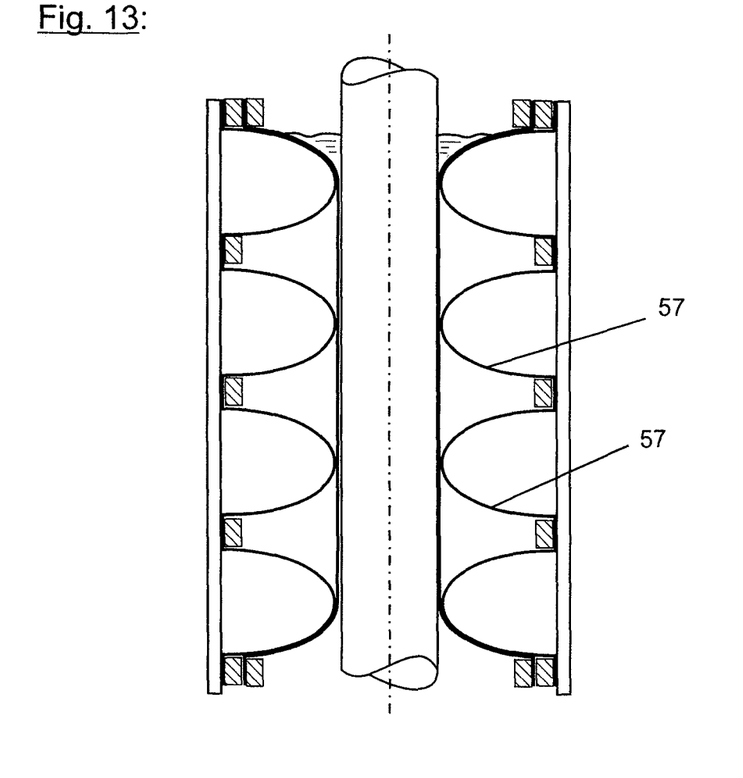

FIG. 13 shows a variant of the exemplary embodiment of the invention shown in FIGS. 11 and 12. Here, additional hoses are arranged between the hose 51 and the hose 52. In the embodiment shown they represent two additional hoses 57, where more or fewer hoses may be provided here.

Figure 14:
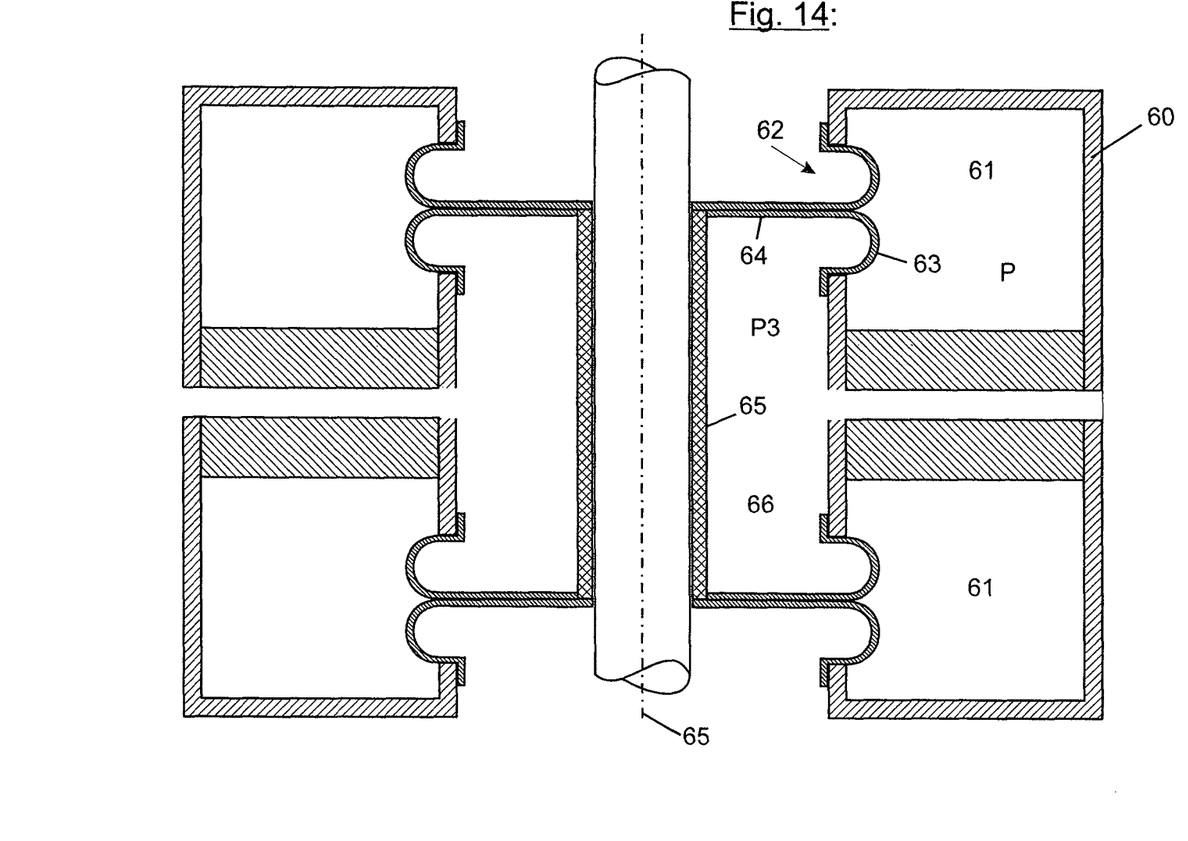

FIG. 14 shows another exemplary embodiment of the invention in which several spaces are provided, impinged with different pressures. Unlike the hoses 51, 52, and 57 shown in the exemplary embodiments of FIGS. 11 through 13, they are primarily not made from an elastic material but largely represent solid elements 60. These solid elements each encompass an annular space 61 (which may also be called "chamber"), with an annular opening 62 being provided, which is arranged on the inside of the solid element 60 facing the film bubble. The opening is, however, closed by an elastically deformable membrane 63. A connection part 64 is arranged at the membrane 63. The membrane 63 and the connection part 64 can here be formed in one piece (as shown in FIG. 14) or comprise several parts. The membrane 63 and the connection part 64 may be single ply or comprise several layers. The connection part 64 is formed like a disk, for example, with a central and circular opening being provided, surrounded by an internal brim, through which the film bubble can penetrate.

By the variation of the pressure p in the chamber 61 the membrane 63 is pulled away or moved in the radial direction away from the central axis 67 of the arrangement, which represents the central axis of the film bubble 6. This way, the connection part is also expanded or the pre-stress is reduced so that ultimately the diameter of the circular opening is enlarged or reduced.

Figure 15:
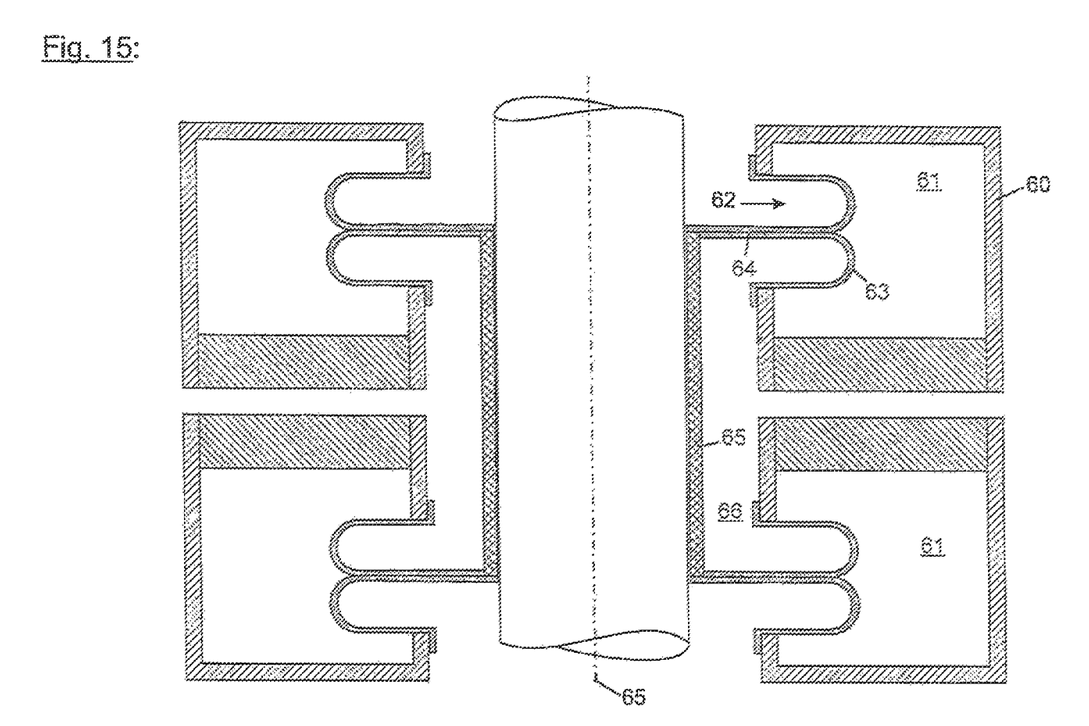

At least one annular space 61 is provided, which shows a membrane 63 and a connection part 64. An elastically deformed sheath 65 is fastened at the interior edges of the connection part 64. Each end of the sheath 65 is preferably arranged at the interior edge of a connection part. At a change of the diameter of the circular opening the interior diameter of the sheath also changes, so that the calibration diameter D can be changed. FIG. 15 shows a diameter D' changed in reference to the diameter D of FIG. 14. The marking with reference characters was waived in FIG. 15, because they are discernible for these individual elements in FIG. 14.

Membranes 63, connection parts 64, sheath 65, and the interior sides of the solid elements encompass one or more spaces 66, in which the interior pressure p3 can be respectively changed. This way, as explained in the context of FIGS. 11 through 13, the interior diameter D can be changed in turn in the direction x depending on the position. Here, too, it may be desired to adjust the diameter particularly to be constant, thus independent of the position in the direction z.

Based on FIGS. 2 through 15, largely exemplary embodiments have been discussed, in which a change of the calibration diameter D occurs essentially by a change of the fluid pressure inside a space at least encompassed partially by an elastically deformable element.

Figure 16:
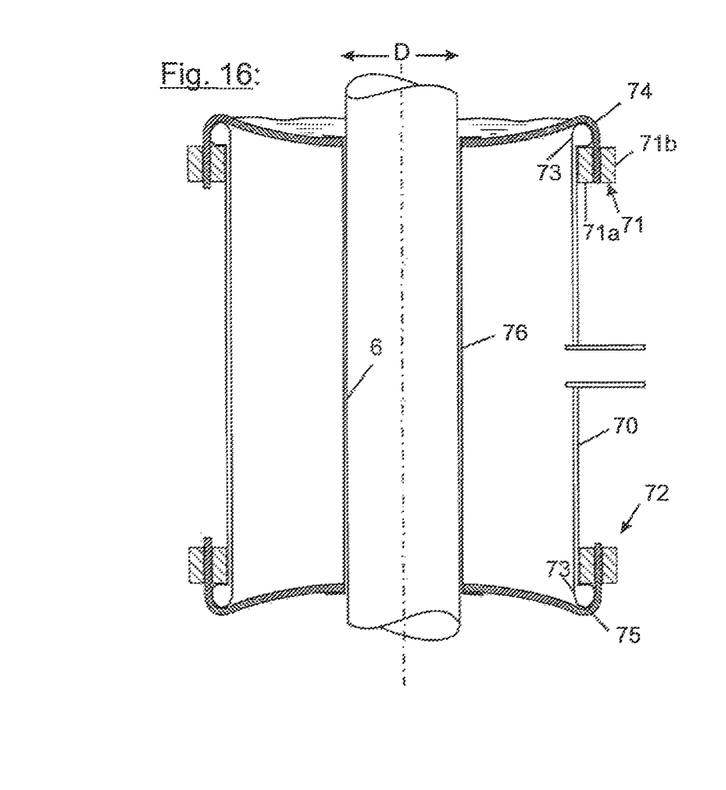
Figure 17:
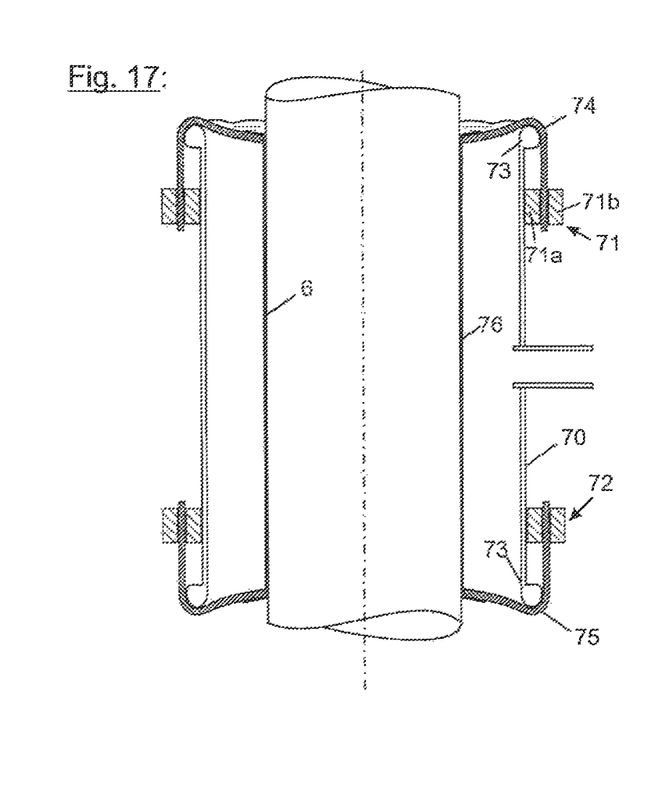
FIG. 17 similar to FIG. 16; however, with a film guiding element with a larger diameter FIG. 18 similar to FIG. 11; however, with a different embodiment of a liquid cooling [system]

In the following, an exemplary embodiment is explained, which is shown in FIGS. 16 and 17. FIG. 16 is here similar to the exemplary embodiment according to FIG. 7. The calibration device 7 according to FIG. 16 also comprises a tube 70, with two rings 71 and 72 being arranged on its exterior perimeter displaceable in or against the direction z. The ends of the tube 70 comprise rounded edges 73, with elastic membranes 74, 75 being pulled over it. The exterior edges of the membranes are fastened at the rings 71 and 72 in a suitable fashion. For example, each ring may comprise two parts 71a and 71b and/or 72a and 72b, wherein the membranes may be held in a clamping fashion between the two partial rings.

The membranes in turn comprise central, circular openings, through which the film bubble can be guided. An elastic sheath 76 is fastened at the edges encompassing the openings. In order to change the diameter of the calibration D now the rings 71 and 72 can be displaced in reference to the tube 70. Dependent on the direction of displacement and, if applicable, dependent on the pre-tension of the membranes 74 and 75, the diameter of the openings of the membranes 74 and 75 increases or reduces. The diameter of the sheath 76 changes similarly at these points. It may occur that the diameter of the sheath 76 changes unevenly over the entire extension in the direction z. In this case it is provided to impinge the space limited by the tube 70, the sheath 76, and the membranes 74 and 75 with a pressure or a vacuum so that the sheath assumes the same diameter D over its extension.

In order to move the rings 71 and 72, various devices may be possible. One variant is the arrangement of a plurality of threaded rods, each respectively showing two opposite threads. These threads may be screwed into threaded bores of the rings. The rotation of the threaded rods, which may occur manually or by a drive, leads to the rings moving evenly towards each other or apart.

In another variant one or more annular work gears may be provided, which surround the tube 70 and onto which the rings 71 and/or 72 can be screwed. A rotation of the worm gear leads to a lateral motion of the ring 71 and/or 72 in the axial direction of the tube 70.

Figure 18:
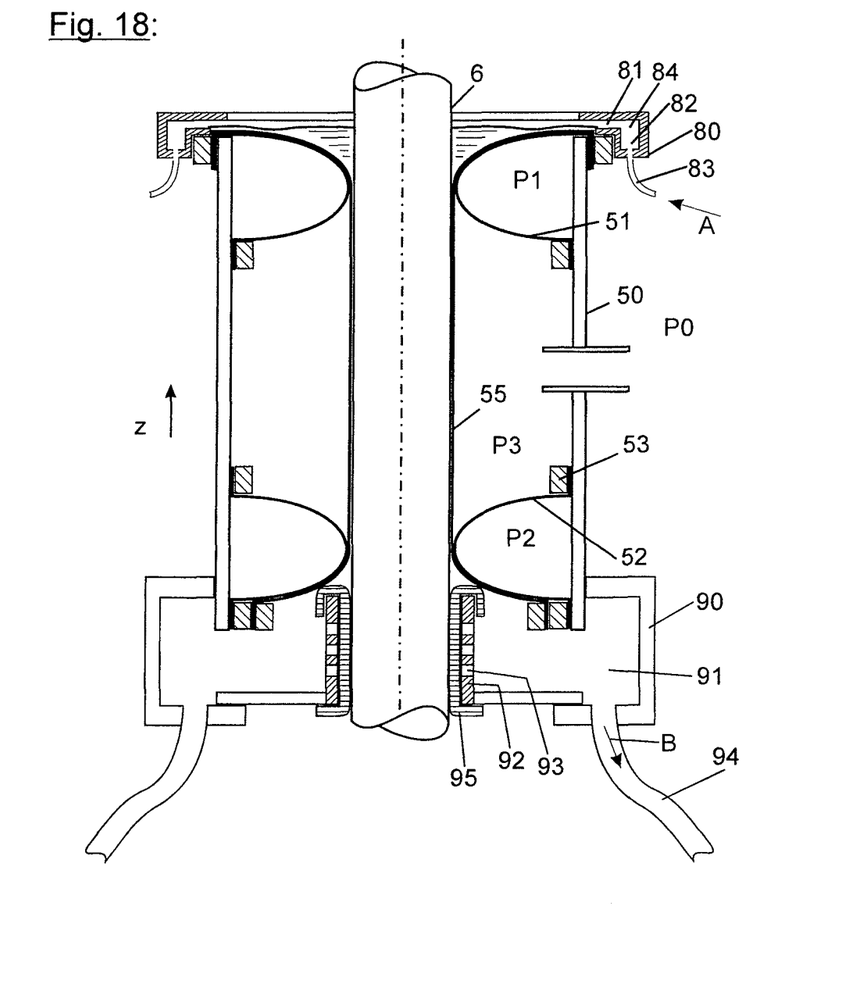

FIG. 18 now shows an embodiment based on the one of FIG. 11; however, provided with an example for a liquid cooling. Of course, this example is also applicable for all other embodiments of the invention.

A ring 80 is provided above the tube 50, which comprises at its interior surface a circumferential opening 81 and which encompasses an annular chamber 84. Seen in the radial direction the ring 80 projects the tube. In this part projecting the tube 50 a circumferential recess 82 is inserted, which may serve as a liquid reservoir. The liquid is fed via supply hoses 83, which advantageously may be distributed evenly over the circumference of the ring, indicated by the arrow A. With a sufficiently high liquid level inside the annular chamber the liquid exits the circumferential opening 81 and runs into the inlet area between the elastically deformable sheath 55 and the film bubble 6. Here, a liquid ring is formed. The film bubble entrains a small portion of the liquid, with the latter cooling the film bubble.

In order to allow removing the liquid after its cooling effect from the film bubble a second ring 90 is arranged underneath the tube, which also forms an annular chamber 91. The interior wall 92 is provided with openings 93, through which water can be suctioned off the surface of the film bubble. A vacuum source is connected in order to suction off the annular chamber 91 via one or more tubes 94. The direction of suction is indicated by the arrow B. In order to prevent damaging the film bubble 6 at the openings 93, these are covered with a porous material 95, through which the liquid can be supplied, but which prevents any deformation of the material of the film bubble. For example a web, perhaps a textile web, may serve as the porous material. Many other materials are possible which show the suitable features of the above-mentioned application. The ring 90 may be open in the area of the elastically deformable sheath 55; however, it is sealed by the sheath in order to obtain good suction effect of the vacuum source.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A calibration device for variable diameter calibration of a film hose produced via a blow-extrusion film device, by which the film hose is produced in a specified diameter, the calibration device comprising:
a film guiding element by which the film hose, which is supported on an interior thereof by a first fluid, is guided, the film guiding element (i) including an elastically deformable element that contains therewithin and in direct contact therewith, a second fluid, and (ii) being located on an exterior of the guided film hose; and
a third fluid disposed between the elastically deformable element and an external surface of the film hose, the third fluid flowing downward between the external surface of the film hose and the elastically deformable element so as to reduce friction therebetween,
with the variable diameter calibration being effected by application of a force to, or removal of the force from, the elastically deformable element, so as to expand or contract, respectively, the elastically deformable element toward or from the external surface of the film hose, and provide the specified diameter of the film hose.

2. The calibration device according to claim 1, wherein the force is applied to the elastically deformable element via a force generating device.

3. The calibration device according to claim 2, wherein the force generating device includes an adjustment mechanism, by which the force can be changed.

4. The calibration device according to claim 2, wherein the force that is applied to the elastically deformable element is the application of a pressure or a vacuum to the second fluid.

5. The calibration device according to claim 2, wherein the force that is applied to the elastically deformable element is at least one of an electromagnetic force and a magnetic force.

6. The calibration device according to claim 1, wherein the elastically deformable element is arranged inside a component having an open hollow space, and which is in a sealing contact therewith at least one of facial edges and an area of an exterior surface of the component.

7. The calibration device according to claim 6, further comprising at least a second elastically deformable element that is arranged between the elastically deformable element and the component having the open hollow space.

8. The calibration device according to claim 6, wherein at least a section of the elastically deformable element can be moved relative to the component along an area of said component.

9. The calibration device according to claim 1, wherein the second fluid is a gas.

10. The calibration device according to claim 9, wherein the gas is air.

11. The calibration device according to claim 6, wherein the component is a tubular or a cylindrical element, and wherein a space between the tubular or the cylindrical element and the elastically deformable element can be impinged with the second fluid subject to a pressure or a vacuum.

12. The calibration device according to claim 1, wherein the third fluid is a liquid.

13. The calibration device according to claim 12, wherein the liquid is water.

14. The calibration device according to claim 1, wherein the third fluid is employed to cool the film hose.

15. The calibration device according to claim 1, wherein the elastically deformable element that contains the second fluid is secured with a fluid-impermeable connection.

16. The calibration device according to claim 1, wherein the first fluid that supports the interior of the film hose is a gas.

17. The calibration device according to claim 16, wherein the gas is air.

18. A device for variable diameter calibration to a specified diameter of a film hose produced with a blow-extrusion film device, the device comprising:
 a film guiding element that guides the film hose, which is supported on an interior thereof by a first fluid, the film guiding element (i) including an elastically deformable element that contains therewithin and in direct contact therewith, a second fluid and, (ii) being located on an exterior of the guided film hose; and
 a water inlet that supplies water so as to provide a column of water between the elastically deformable element and an external surface of the film hose, the water flowing downward between the external surface of the film hose and the elastically deformable element so as to reduce friction therebetween,
 with the variable diameter calibration being effected by application of force to, or removal the force from, the elastically deformable element, so as to expand or contract, respectively, the elastically deformable element toward or from the external surface of the film hose, and provide the specified diameter the film hose.

19. The device according to claim 18, wherein the water inlet supplies the water to a portion of the device at which the guided film departs from contact with the elastically deformable element.

20. The device according to claim 18, wherein the water inlet supplies the water such that the downward flow of the water column is countercurrent to a travel direction of the guided film hose.

21. The device according to claim 18, wherein the water column is employed to cool the film hose.

22. A method of variable diameter calibration to a specified diameter of a film hose produced with a blow-extrusion film device, the method comprising:
 guiding the film hose, which is supported on an interior thereof by a first fluid, with a film guiding element, the film guiding element (i) including an elastically deformable element that contains therewithin and in direct contact therewith, a second fluid, and (ii) being located on an exterior of the guided film hose; and
 providing a third fluid between the elastically deformable element and an external surface of the film hose, the third fluid flowing downward between the external surface of the film hose and the elastically deformable element so as to reduce friction therebetween,
 with the variable diameter calibration being effected by application of a force to, or removal of the force from, the elastically deformable element, so as to expand or contract, respectively, the elastically deformable element toward or from the external surface of the film hose, and provide the specified diameter of the film hose.

23. The method according to claim 22, wherein a force is applied to the elastically deformable element via a force generating device.

24. The method according to claim 23, wherein a magnitude of the applied force is adjustable so as to change a diameter of the elastically deformable element.

* * * * *